US010015851B2

(12) United States Patent
Bannister

(10) Patent No.: US 10,015,851 B2
(45) Date of Patent: Jul. 3, 2018

(54) BALLAST CIRCUIT

(71) Applicant: ACCURIC LTD, Crowle, Worcestershire (GB)

(72) Inventor: David Charles Bannister, Worcestershire (GB)

(73) Assignee: Accuric Ltd., Worcestershire (GB)

(*) Notice: Subject to any disclaimer, the term of this patent is extended or adjusted under 35 U.S.C. 154(b) by 0 days.

(21) Appl. No.: 15/504,589

(22) PCT Filed: Jul. 27, 2015

(86) PCT No.: PCT/GB2015/052163
§ 371 (c)(1),
(2) Date: Feb. 16, 2017

(87) PCT Pub. No.: WO2016/027060
PCT Pub. Date: Feb. 25, 2016

(65) Prior Publication Data
US 2017/0238380 A1 Aug. 17, 2017

(30) Foreign Application Priority Data
Aug. 18, 2014 (GB) .................................. 1414589.0

(51) Int. Cl.
H05B 33/08 (2006.01)

(52) U.S. Cl.
CPC ....... *H05B 33/0815* (2013.01); *H05B 33/089* (2013.01); *H05B 33/0851* (2013.01); *H05B 33/0887* (2013.01)

(58) Field of Classification Search
CPC ............ H05B 33/0815; H05B 33/0833; H05B 33/0845; H05B 33/0851; H05B 33/0887; H05B 33/089
See application file for complete search history.

(56) References Cited

U.S. PATENT DOCUMENTS

2011/0025217 A1* 2/2011 Zhan ..................... H02M 3/335
315/219
2011/0291576 A1* 12/2011 Wong ................. H05B 33/0815
315/210

(Continued)

OTHER PUBLICATIONS

International Search Report, International Application No. PCT/GB2015/052163, dated Jan. 20, 2016.

Primary Examiner — Jason M Crawford
(74) Attorney, Agent, or Firm — Steve M. Shape; Dennemeyer & Associates, LLC

(57) ABSTRACT

A ballast circuit suitable for driving an LED or similar load, comprises a primary switch mode converter, means for measuring a modulation, such as a phase cut, as used for dimming light levels, on an input AC supply, a current regulator positioned in series with the load, and a feedback controller for controlling operation of the switch mode controller based upon measured modulation levels. The feedback controller is adapted to interrupt normal switching of the switch mode converter if modulation levels detected lead to the ballast working at a lower than desired efficiency (deep dimming), or if voltage levels across the current regulator are higher than desired. The feedback controller may have a further feedback means for controlling switch mode parameters during lower levels of modulation (shallow dimming). The circuit allows large dimming levels to be achieved without generating appreciable light flicker in the load.

28 Claims, 4 Drawing Sheets

(56) References Cited

U.S. PATENT DOCUMENTS

| | | | |
|---|---|---|---|
| 2012/0019714 A1* | 1/2012 | Hiramatu | H05B 33/0815 |
| | | | 348/370 |
| 2012/0032613 A1* | 2/2012 | Liu | G09G 3/3406 |
| | | | 315/297 |
| 2013/0009557 A1 | 1/2013 | Szczeszynski | |
| 2013/0128627 A1* | 5/2013 | Moon | H02M 3/33507 |
| | | | 363/21.17 |
| 2014/0055045 A1 | 2/2014 | Raval et al. | |
| 2014/0203715 A1* | 7/2014 | Le | H05B 33/0815 |
| | | | 315/185 R |
| 2015/0084527 A1* | 3/2015 | Siu | H05B 33/0815 |
| | | | 315/186 |
| 2015/0312983 A1* | 10/2015 | Hu | F21K 9/1355 |
| | | | 315/186 |
| 2016/0198537 A1* | 7/2016 | Bannister | H05B 33/0815 |
| | | | 315/200 R |

\* cited by examiner

BALLAST CIRCUIT

FIELD OF INVENTION

The present invention relates to ballasts and power circuits, of the type typically used in driving variable loads, such as dimmable light emitting diode (LED) lighting arrangements. More particularly, it relates to ballasts and drivers, particularly suited for supplying loads such as LEDs, including organic LEDs (OLEDs) that have means to reduce optical flicker that can occur during the dimming process.

BACKGROUND

LED lighting is starting to become a mainstream choice for low energy lighting. In order for LED technology to fully establish its credentials in this field, and to fit in with current expectations of users, it is highly advantageous for LED-based lighting systems to provide a means for dimming the light intensity emitted, in response to an 'instruction', or signal, provided by a dimming means. Such a means can take one of several forms, depending upon the age, purpose and architecture of the lighting system. One of the most common forms, is termed a phase-modulation approach, and is applied to the incoming AC voltage. Such a process involves the interruption of the alternating input voltage over part of its positive and negative cycles and is often referred to as 'phase cutting'. The degree of interruption is expressed as a 'cut angle'—this being the phase angle of each half-cycle during which the input voltage is zero. Such a process essentially modulates the RMS voltage available to a ballast, or driver, which in turn, modulates the DC power provided to a light source. The ballast therefore provides a transfer function between the degree of phase cutting provided by a dimmer switch or slider, and the luminous output of the light source.

Dimmer controls that use the phase cutting approach, have been in use for many years, and were designed originally for use with tungsten light bulbs. It is convenient therefore for a ballast associated with a replacement LED bulb to be able to function with such controls.

In LED lighting, the light source, being a semiconductor junction device, is sensitive to electrical impulses up to very high frequencies. More specifically, the light output from an LED is directly related to the electrical current flowing through it. Therefore, the electrical impulse to which an LED is sensitive, and in response to which it's light output will change, is any change in LED current. So, if the LED current fluctuates, so does the light output. This is the basic origin of LED flicker. In addition to this, any fluctuations in the current supplied to the LED can introduce additional heating within the device, thereby reducing its lifetime.

For LED lighting—from domestic lighting and industrial lighting, through to street-lighting and signage—there are two major performance shortfalls that currently stand in the way of widescale technology adoption. These are lifetime and flicker. Given that both of these are related in part, to LED current ripple, it is desirable that lighting ballasts are developed that provide sufficiently low levels of ripple. However, as explained later, flicker can also be produced by low frequency modulation, which is frequently applied to LEDs as a means of dimming.

In the general case of dimmable LED lighting, there can be two major sources of photometric flicker. The first of these is a current or voltage tone at the second harmonic of the AC line frequency. The presence of this second harmonic (at twice the AC line frequency) arises as a result of full-wave rectification of the incoming mains—normally performed using a diode bridge. This fluctuation—normally in the frequency range 100 to 120 Hz—will, if un-filtered, give rise to flicker in the LED load. The most common method for filtering this unwanted output from an LED lighting ballast based on an isolated topology, such as a Flyback Converter, is to place a large-value smoothing capacitor at the output of the ballast, where the said capacitor sits in parallel with the LED load. A voltage ripple is produced across this capacitor, in response to the fact that full-wave rectified current is supplied to it by the ballast, whilst a DC current is being extracted by the LED load. With all other things being equal, the higher the value of this smoothing capacitor, the lower the voltage ripple produced across it at the second harmonic frequency, and therefore, the lower the current ripple in the LED load produced thereby. When using this approach, however, practical limits exist on the size of the capacitance. For instance, if an LED lighting ballast is used in conjunction with a phase-cut dimmer employing a leading edge phase cut, then high values of capacitance at the output of the ballast can give rise to instabilities in the dimmer and/or ballast.

The second source of flicker that can occur in the general case of LED dimming is the use of Pulse Width Modulation (PWM) for the purposes of dimming. This involves switching the LED current on and off, or on and nearly off, thereby sampling the on-state current, through what is essentially a time-domain gating process. Such a process generally introduces a flickering mechanism, whereby flicker occurs at the frequency of the PWM waveform. In extremis, when the off-state current is zero, the flicker has a modulation depth (often referred to as 'flicker percentage') of 100%. Research has shown that the sensitivity of an observer, to such flicker is strongly related to the frequency of the flicker and therefore to the frequency of the PWM. Depending upon various factors, including the presence of other light sources, it has been determined that a significant proportion of the population are sensitive to stroboscopic effects arising as a result of LED light flicker at frequencies up to at least 1.25 KHz, and frequently up to 3 KHz.

In view of the preceding, for the purpose of minimising low frequency photometric flicker, it is advantageous to reduce this said ripple current, whilst ensuring that any PWM applied to the light for the purposes of dimming is at a frequency above at least 1.25 KHz, and preferably above 3 KHz.

The process by which ripple current is produced in a phase-dimmable LED lighting ballast can be illustrated by reference to FIGS. 1 and 2. FIG. 1 shows, in schematic form, a dimmable LED lighting scheme, wherein an incoming AC mains voltage Vac is phase-cut by a phase cutting dimmer (1). After passing through a diode bridge (2) and a Flyback converter, or similar power converter circuit (3) operating in constant current mode by reference to the LED load current ($I_{LED}$) a full-wave rectified current is injected into the parallel combination of output capacitor (4) and LED load (5). FIG. 2 shows the time domain waveforms of the current, i(t) into the said parallel combination and the voltage, v(t) across it. The voltage waveform is applied across the LED load, which in turn typically comprises a string of series connected LEDs. It is relatively simple to appreciate that, in view of the low differential impedance of LEDs (i.e. the rate of change of voltage with current) any such voltage waveform, containing as it does, appreciable peak-to-peak ripple, will give rise to significant current ripple in the/each LED string. Such current ripple will in-turn, give rise to flicker in the light emitted by the LEDs.

Referring to FIGS. 1 and 2, as the cut angle, ϕ increases within the first quadrant (from 0 to 90°) the amount of charge injected into the capacitor (4) by the power converter circuit, during each cycle of the mains, reduces. Consequently, if the current taken by the load (5) was to remain constant during the first stages of dimming (from ϕ=0 to some phase angle within the first quadrant) then the peak-to-peak voltage ripple across the capacitor (4)—shown by the bold line in FIG. 2—would increase. This in turn, in the absence of a ripple suppression mechanism, would give rise to increased current ripple in the LED load and therefore, increased flicker.

This presents a significant challenge in the case of ballasts that exhibit appreciable current ripple in the un-cut (ϕ=0) state. Any increase in this ripple during low angle cutting will exacerbate flicker in the load. One manifestation of this would arise in the case of a conventional ballast being used in conjunction with a phase-cutting dimmer which has an unknown or variable minimum cut-angle. Ideally, in order to provide a smooth current dimming profile, where the minimum cut angle of the dimmer is mapped onto the full on (undimmed) current state of the ballast, the flicker in the undimmed state would vary between installations using different phase-cut dimmers. Consequently, in order to facilitate adaptive dimming, whereby the dimming range of the ballast can be mapped onto the phase-cutting range of the dimmer, the ballast should ideally include a mechanism by which current ripple is suppressed, or sufficiently reduced, at all values of cut-angle ϕ, at least within the first quadrant.

For the purposes of dimming, and in view of the fact that the light output from an LED is proportional to the current drawn by the LED, it is desirable to introduce a mechanism by which the current through the LED load is well-defined for any given cut angle, and where the said current is reduced (dimmed) in response to increasing cut angle. This may involve a control circuit operative wherein the cut-angle is translated into a PWM signal that is triggered by, and therefore at the same frequency as, the full-wave rectified input voltage.

Such a scheme is known in the prior art, as exemplified by Chu et al (U.S. Pat. No. 8,193,738). This discloses an LED power supply, or ballast, which, through the use of a modulated current control unit, together with a forward secondary winding on a mains transformer, both reduces the ripple current for a given smoothing capacitance and enables the use of larger smoothing capacitors. Whilst this, and similar schemes, represent a significant improvement in ripple performance and therefore flicker performance, the remaining ripple would still produce appreciable flicker, detectable by a significant proportion of observers.

The fundamental shortcoming of such approaches is that they continue to rely, to a large extent, on the smoothing effect of a capacitor as the main mechanism by which ripple and therefore flicker is reduced. This in particular means that whilst the disclosure of Chu et al enables the value of the smoothing capacitance to be increased, it retains the reliability problems experienced by power supplies that use high values of output capacitance. Furthermore, increasing the output capacitance for the purposes of reducing ripple and flicker means increasing the physical size of the ballast.

A more generalised scheme for translating phase-cut information from a phase-dimmer, into a controllable current dimming mechanism, whereby the degree of current dimming has a 1:1 relationship with the cut-angle, ϕ, is disclosed in aspects of exemplary embodiments of Lys et al (U.S. Pat. No. 7,038,399). Here again, however, any suppression of current ripple at the second harmonic of the mains frequency and therefore photometric flicker at this second harmonic, relies substantially on the action of a parallel combination of the differential impedance of an LED load and a smoothing capacitor.

A second limitation of both U.S. Pat. No. 8,193,738 and U.S. Pat. No. 7,038,399 lies in the fact that as the current extracted from a switch-mode power supply is reduced, to enact deep-dimming, there comes a point at which the current and therefore power demanded by the load is less than the minimum power deliverable by the power supply in continuous switching (i.e. non-hiccupping) mode. If dimming were attempted beyond this point, the power-supply would typically go into 'hiccup mode' whereby it delivers short bursts of charge to its output capacitor, sufficient to keep the capacitor charged, thereby maintaining an open-circuit output voltage that varies in a pulse-like fashion. This pulse-wise voltage would, if the power supply were dimmed so deeply as to bring about hiccup mode, then appear across the load, comprising at least in part an LED or collection of LEDs, thereby generating photometric flicker at the repetition frequency of the hiccupping. The output power of the power supply at which hiccup mode would be entered, therefore defines the minimum output power under normal operation and therefore the maximum dimming depth of the overall lighting ballast incorporating the power supply.

A limitation that applies to most dimmable switch-mode LED lighting ballasts, lies in the fact that as the output current and therefore output power, are dimmed, there comes a point below which the efficiency of the power supply falls significantly—by e.g. more than 10 percentage points below its undimmed value. This means that the oscillatory power, taken from the input rectifier does not fall pro-rata with the output power, delivered to the LED load. This in turn, results in increased percentage voltage ripple across the output capacitor of the ballast, and therefore increased percentage current ripple in the LED load. This translates to increased optical flicker percentage in the LED load. Furthermore, any such fall in efficiency during dimming will result in input power ceasing to fall pro-rata with output power, thereby militating the effect of dimming. Therefore, introducing a means by which efficiency can be more substantially maintained throughout the dimming process ensures that input power is more significantly reduced during dimming, thereby increasing energy saving arising as a result of dimming.

There therefore exists in the art, both from a photometric flicker perspective and from the perspective of maximising LED lifetime, a need to reduce more significantly, and preferably to a level of around 2% peak-to-peak or lower, the current ripple emanating from an LED ballast which in turn, is taking a phase-cut AC input, for the purpose of actuating dimming. Also, for the purposes of maximising the energy-saving potential of LED lighting, such a low flicker ballast should possess a wide dimming range, preferably from a full-on current down to less than 0.1% of the full-on current. Furthermore, the current ripple should ideally remain below 2% peak-to-peak throughout the entire dimming range.

SUMMARY OF INVENTION

According to a first aspect of the present invention there is provided a ballast for converting a rectified AC input into a drive current output, said ballast comprising:
a primary switch-mode converter, arranged to provide a charge to a capacitor, the converter having an interruption means, to interrupt the converter's regular switch mode operation, and means to control its internal pulse width modulation parameters;

a current regulator which, in use, is in series with a load, said regulator and load being in parallel with the capacitor;

means for determining a desired degree of power modulation to be applied to the drive current output;

a monitoring system arranged to monitor a voltage across the current regulator, and an interrupt feedback means for providing a feedback signal to the interruption means, and arranged to interrupt the primary switch-mode converter, based upon the monitored voltage across the current regulator, wherein the interrupt feedback signal is arranged to interrupt the primary switch-mode converter when the degree of modulation to be applied to drive current output reaches a given threshold.

It is well understood by those normally skilled in the relevant arts that a switch mode converter being supplied by a rectified AC signal (whether phase cut or not) will have, on its output voltage a ripple at the frequency of the rectified AC signal, as stated above, due to the physical limitations of such converters as coupled to a capacitor of finite value. Accordingly, embodiments of the invention provide a feedback mechanism arranged to control aspects of the converter, such as the duty cycle of its pulse width modulation circuitry (which typically operates at several tens of kHz, or higher), that operates to smooth the output voltage over the ripple cycle.

However, by means of embodiments of the invention a ballast is provided that allows a phase-cut dimming operation to take place to dimming levels wherein, in prior art systems, the efficiency of the converter drops significantly, and so introduces large amounts of ripple to the output current supplied to the LEDs. The present invention, by contrast to these prior art systems, monitors the voltage across a current regulator, operable in series with an LED load and is able to deliberately introduce, as required, a controlled hiccup to the converter, and to switch the controlled hiccup by means of a feedback loop, responsive to the detection of maximum and minimum voltages across the said regulator.

Embodiments of the invention provide a ballast that is compatible with typical phase cutting dimmer switches, as are present in light switch fittings used in many residential and commercial buildings. Thus an LED lighting unit incorporating particular embodiments of the invention may be used in such buildings, and with such existing electrical fittings without modification of the dimmer switches.

Embodiments of the invention may incorporate a control signal generation circuit or system, that itself comprises a monitor circuit arranged to monitor the rectified AC signal and to provide an output comprising a measure of the degree of modulation applied thereto. The control signal generation circuit may be arranged to generate an output signal of either a voltage or a current, that is related to the power of the AC signal following the phase cutting, or other modulation applied thereto. Conveniently an output voltage is provided. The output voltage may be used to control the duty cycle of a high frequency Pulse Width Modulation (PWM) signal, which in turn provides an ON-OFF modulation of the regulated current of the current regulator, thereby adjusting the time-average current through the LED load.

Advantageously, the frequency of the pulse width modulation is sufficiently high that optical flicker at that frequency is not generally perceivable by the human eye, either directly, or stroboscopically. Advantageously, the frequency of the PWM signal is greater than about 1 KHz, and more preferably greater than about 1.25 KHz, 2 KHz or 3 KHz.

Certain embodiments may incorporate a current regulator that, instead of being operable via a switched signal as described above, is controlled by an analogue signal. Such a current regulator may therefore have an input that, by application of a suitable voltage or current, modulates the regulator current accordingly. These embodiments may have a control signal generation circuit that provides a voltage or current to the regulator that is related in some manner to the power of the AC signal (e.g. the degree of phase cut applied thereto).

Certain embodiments may use the control signal to control the current regulator directly, whereas others may be arranged to control a switch or linear controller in series with the current regulator.

The control signal generation circuit may be arranged to measure the degree of phase cutting in the AC signal by any suitable means.

A preferred control signal generation circuit comprises an auxiliary switch mode converter arranged to take its input from the AC signal (as modulated by e.g. a phase cutter), and to feed a fixed resistive load. The voltage across the resistive load may be monitored by any suitable means, such as with an analogue to digital converter (ADC). The voltage may be used to control the current regulator as described above.

Alternatively, the control signal generation circuit may be arranged to monitor directly (via suitable level shifting or scaling circuitry) the AC signal (as modulated by e.g. a phase cutter), and to generate a control signal based upon the mean level of the AC signal. For example, an ADC may be arranged to sample the AC signal, to compute a mean value thereof, and to generate a control signal accordingly.

Alternatively, a control signal generation circuit may be arranged to monitor directly (via suitable level shifting or scaling circuitry) the AC signal (as modulated by e.g. a phase cutter) and to generate a control signal based upon the time span over which the AC voltage is equal to zero. For example, an ADC may be arranged to sample the AC signal, compute the zero AC voltage time span, and to generate a control signal accordingly.

The skilled person will appreciate that the direct monitoring approach for the control signal generation circuit may be beneficial in reducing component count, but use of the auxiliary flyback converter may be advantageous where increased isolation of the control signal generation circuit from the AC signal is required.

Alternatively, embodiments of the invention may be arranged to have as an input a rectified AC signal that has no power modulation applied thereto, but wherein a separate modulation input is provided. The separate modulation input may comprise a signal that can vary between a minimum and a maximum value, with the minimum being indicative of the desire for maximum dimming to be applied to an LED load, and the maximum indicative of the desire for no dimming to be applied to the LED load.

Such embodiments may have a control signal generation system that is arranged to provide a suitable modulation signal (such as a PWM signal as described in relation to other embodiments) wherein the duty cycle D varies according to the level of the modulation input.

The modulation input may comprise for example a DC voltage that varies between 0V and 10V, or between any other range of values as appropriate.

The interruption means may comprise a gate, switch or other component that acts to interrupt the regular operation of the primary switch mode converter. The gate, switch etc. may, as will be described in more detail below, be implemented in hardware (such as with a transistor, or other switch), or may be configured in software, where it may comprise for example instructions to temporarily halt the provision of a PWM signal. Similarly, the interruption feedback means may comprise a hardware feedback loop, such as a wire or other electrical connection, or instructions in software that provide a similar function.

Referring to FIG. 3(a) for ease of explanation, and without limitation, it will be appreciated by those of ordinary skill in the art that, even in the absence of any dimming, the DC voltage across an LED load, (309), will, at a given current, vary with both temperature and size of the load (e.g. the number of LEDs in series). Consequently, if the DC voltage across the series combination of such an LED load and a constant current regulator is held constant, then the voltage across the said constant current regulator will vary with temperature and/or LED load size. This, if un-compensated, would give rise to performance degradations in an overall ballast according to the topology of the present invention. In particular, during warm-up, the voltage drop across each LED in the load reduces, by a few mV per Kelvin. Therefore, if the total voltage across the series combination of LED load and current regulator were held constant, then the voltage across the current regulator would increase. This in turn would increase the power dissipation in the said regulator, thereby reducing the overall efficiency of the ballast.

Similarly, during dimming, any imbalance between the charge extracted from the output capacitor (307) during each mains cycle by the combination of current regulator (310) and LED load (309) and the charge supplied to the said capacitor during each mains cycle by the Flyback converter (304) would give rise to variations in both the mean voltage and the peak-to-peak voltage ripple, across the capacitor (307). For example, if the charge per cycle demanded by the load is reduced more rapidly than the charge per cycle provided by the flyback converter, then the mean voltage across capacitor (307) will rise and the peak-to-peak voltage ripple across capacitor (307) will fall. Consequently, although, under these circumstances, the current ripple in the load would fall, the efficiency of the overall ballast would do likewise. Conversely, if the charge per cycle demanded by the load reduced less rapidly than the charge per cycle being provided by the flyback converter (304) then the voltage ripple across capacitor (307) would increase. This in turn would result in increased voltage ripple across the regulator (310) and therefore increased current ripple in the LED load (309). This in turn would give rise to increased photometric flicker in the light emitted by the said LED load.

For these reasons, relating to both efficiency and flicker, it is advantageous, within an LED ballast according to the present invention, to maintain a substantially constant mean voltage across the current regulator used therein. This is done by use of a shallow-mode feedback loop.

In response to any variation in the voltage across the current regulator, a feedback signal is provided to the primary switch mode converter to vary at least one of the switching frequency, or duty cycle of the PWM signal on its output. The nature of the feedback arrangement is such that a drop in the measured voltage will tend to increase the charge per mains cycle provided to the output capacitor (by alteration of the PWM switching parameters of the flyback converter (304)), which will tend to increase the measured voltage, so balancing the loop. By this means flicker occurring at the frequency of the rectified AC signal may be substantially reduced, during the early stages of dimming.

However, it has been appreciated by the inventor of the present invention that, notwithstanding the properties of such a control loop, demanding a degree of dimming beyond certain limits can, in prior art arrangements, lead to increased levels of flicker being generated in LED loads. If a significant degree of dimming is demanded, then the feedback signal to the converter will tend to change the PWM switching parameters (e.g. the duty cycle) of the converter to a degree that will tend to make the efficiency of the converter fall appreciably. It is known in the art that such reductions in power supply efficiency during dimming give rise to increases in the ratio between the voltage ripple across the output capacitor, and the DC voltage across the capacitor. This in turn gives rise to an increased current ripple in the LED load, as a percentage of the DC LED load current, with this ratio increasing as dimming gets deeper. Such relative increases in LED current ripple, occurring as they do, at twice the mains frequency, are a major cause of increased 100-120 Hz LED flicker percentage, during deep dimming. Also, any reduction in efficiency during dimming will limit the extent to which input power reduces as output power is reduced.

However, in embodiments of the present invention, an interrupt feedback loop is arranged to prevent the ballast from entering too far into this lower efficiency state. When the PWM duty cycle of the dimming signal demanded by the control signal generation circuit, falls to a predetermined level, such as between 50% and 10%, and preferably to approximately 30%, a second control loop (which functions as the interrupt feedback loop) allows the voltage across the constant current regulator to increase to a predetermined level. Once this level is reached, the said second control loop sends an interrupt signal to the main power converter, causing an interruption to the switch-mode controller within the converter, thereby interrupting the capacitor charging process. This then reduces the voltage across the load, and hence also the voltage across the current regulator. Once the voltage across the current regulator falls to a lower predetermined value, the interrupt control loop removes the interrupt signal, which restarts the regular switching operation of the converter. This is known herein as a controlled hiccup mode. If a significant degree of dimming is still being demanded, then the controlled hiccup process will repeat, as necessary.

During such a controlled hiccup mode, the time average voltage across the current regulator increases, giving rise to a reduction in the efficiency of the current regulator. However, there is no significant reduction in the efficiency of the switch-mode power supply and therefore no significant increase in the percentage voltage ripple across the output capacitor and therefore no significant increase in the current ripple percentage in the LED load, at the frequency of the rectified AC signal. During this process the current ripple through the load at the frequency of the hiccupping is limited by the differential impedance of the current regulator, and so for this reason a regulator having a relatively high differential impedance (as discussed herein) is preferred.

The normally skilled person will be aware that a switch-mode power converter, operating within a control loop, or a number of control loops, provides a switching waveform to a switching element within the converter, whereby the frequency and/or duty cycle of the said switching waveform is responsive to signals provided to the converter, via the control loops. The manner in which the parameters of the switching waveform are controlled by the control loop signals is determined by software that normally resides within the switch-mode power converter. In the case of some embodiments of the present invention, the parameters in response to which the primary and second control loop signals are varied, for the purpose of altering the switching parameters of, or interrupting the switching operation of the primary switch-mode converter, may instead, in some embodiments, be captured by alternative circuitry such as a microcontroller. Therefore, an alternative to using a primary switch-mode converter, under the control of the microcontroller, via hardware feedback loops, is to place the switch-mode converter software within the microcontroller. Using such a control scheme, therefore, the hardware feedback loop shown in FIG. 3(a) would, instead of conveying a feedback signal to a switch-mode controller, within the switch-mode converter (304) send a PWM switching waveform to the switching element within (304) with switching parameters determined by the voltage on the regulator (310) during shallow dimming and where the said PWM switching waveform is interrupted and re-activated during deep-dimming, in response to variations in the said voltage. Therefore, in embodiments of the present invention, in which the interruption of the PWM switching waveform is performed by software residing within the microcontroller, the corresponding interrupt feedback signal takes the form of a logic signal, conveyed by a software feedback, within the said software. The circumstances under which such interrupts occur, as well as the circumstances under which such interrupts are released, thereby re-activating the PWM switching waveform, would be identical to those described earlier herein.

A current regulator suitable for use in certain embodiments of the present invention is disclosed in the international patent application, published as WO2013/005002, the entire contents of which, and particularly its FIG. 6 and associated description, are incorporated herein by reference.

Embodiments of the invention therefore provide a means for generating dimming levels to a high degree, whilst maintaining good control of mains voltage induced flicker. Feedback signals to the primary switch mode converter control flicker that would otherwise be present due to voltage ripple on its output at the rectified AC frequency, while use of a sufficiently high PWM dimming frequency as disclosed herein, such as greater than 1 KHz, and more preferably greater than 1.25 kHz, 2 kHz or 3 kHz ensures that flicker will be generally not perceptible to the vast majority of the population, either directly, or via stroboscopic or similar effects.

The normally skilled person will be aware that the operating frequency of the primary switch mode converter is at tens of KHz or greater, as stated above, and so any ripple induced in the load at those frequencies will not be perceptible as flicker.

As previously explained, the control signal generated by the control signal generation means is, in some embodiments, related to the electrical charge per mains cycle delivered to an output capacitor/load combination, by an AC signal as it appears following any phase cutting or similar power modulation means. As such, an embodiment of the invention may generate a maximum control signal when no power modulation (e.g no phase cutting) is taking place, and a minimum control signal when full modulation (e.g. 179 degrees phase cutting) is taking place. In this manner, a system according to such an embodiment is able to provide a mapping between the control signal and the modulation applied to the AC signal, and so provide a full dimming range to match the degree of modulation. However, it is known that some phase cutting dimmer switches have limitations on either or both of the minimum and maximum degree of phase cutting they are able to perform. Such limitations can be quite significant.

Advantageously therefore, embodiments of the invention may include means for adapting the generated control signal according to the detected variation in power from the modulated AC signal. Accordingly, embodiments of the invention may incorporate means for adaptively modifying a mapping function between the degree of modulation on the AC signal and the current supplied to the load. Advantageously, a microcontroller, or similar computational device may be used to control this mapping.

It should be noted that the control signal generation system is, in preferred embodiments, arranged to provide the shallow feedback signal to the primary switch mode converter throughout the whole modulation range required, and not just e.g. when a shallower dimming is required. In such embodiments, the feedback signal that is being sent to the switch mode converter at the point that the interrupt feedback becomes operational is fixed for the duration the interrupt feedback signal is operative. Thus, it is instructing the switch mode converter to maintain its current switch mode parameters for those time periods between interruptions, for the duration that the interrupt feedback signal is operative. In these embodiments the feedback signal will be operative even when the interrupt feedback signal is being produced by the interrupt feedback circuit. Notwithstanding this, some embodiments of the invention may incorporate just an interrupt feedback loop, although this would not be a preferred embodiment as it would not provide for particularly smooth dimming of a lighting system.

It is clear from the above description that preferred embodiments of the invention employ two main feedback loops. The first, shallow dimming feedback loop, controls switch mode parameters of the primary switch mode converter, while the second, interrupt feedback loop shuts down the switching operation of the primary switch mode converter for a duration determined by signals, such as voltages, measured across the current regulator, or an equivalent signal.

The invention may, in another aspect, be seen as a ballast suitable for driving an LED load comprising a primary switch mode converter, means for measuring a modulation, such as a phase cut, on an input AC supply, a current regulator positionable in series with the load, and a feedback controller for controlling operation of the switch mode controller based upon measured modulation levels, wherein the feedback controller is adapted to interrupt normal switching of the switch mode converter if modulation levels detected lead to the ballast working at a lower than desired efficiency or if voltage levels across the current regulator exceed a predetermined threshold.

According to a further aspect of the present invention there is provided a method of controlling an electrical load comprising the steps of:
  a) providing a switch mode converter, and arranging said converter to charge a capacitor;
  b) arranging the said load to be in series with a current regulator, and arranging said series arrangement across the capacitor;
  c) regularly monitoring a voltage level across the current regulator or across the load;
  d) interrupting the operation of the switch mode converter if the level monitored in step (c) is indicative of the voltage across the regulator being above a predetermined maximum level, wherein said interruption comprises preventing said converter from charging said capacitor; and e) removing the interruption to the switch mode converter if the level monitored in step (c) is indicative of the voltage across the regulator being below a predetermined minimum level;

wherein said minimum and maximum levels are chosen as allowing the current regulator to maintain a differential impedance above a predetermined minimum value.

According to a yet further aspect of the present invention there is provided an illumination apparatus incorporating a ballast of the type described in any of the attached claims.

Said illumination apparatus may comprise a light emitting diode arrangement.

Any feature in one aspect of the invention may be applied to other aspects of the invention, in any appropriate combination. In particular, method aspects may be applied to apparatus aspects, and vice versa. Also, features that are implemented in hardware may, where appropriate, be instead implemented in software, and vice versa.

Embodiments of the invention will now be described in more detail, by way of example only, and with reference to the following Figures, of which:

FIG. 3b illustrates in block diagrammatic form an alternate switching arrangement for the embodiment shown in FIG. 3a;

Figure 4A:
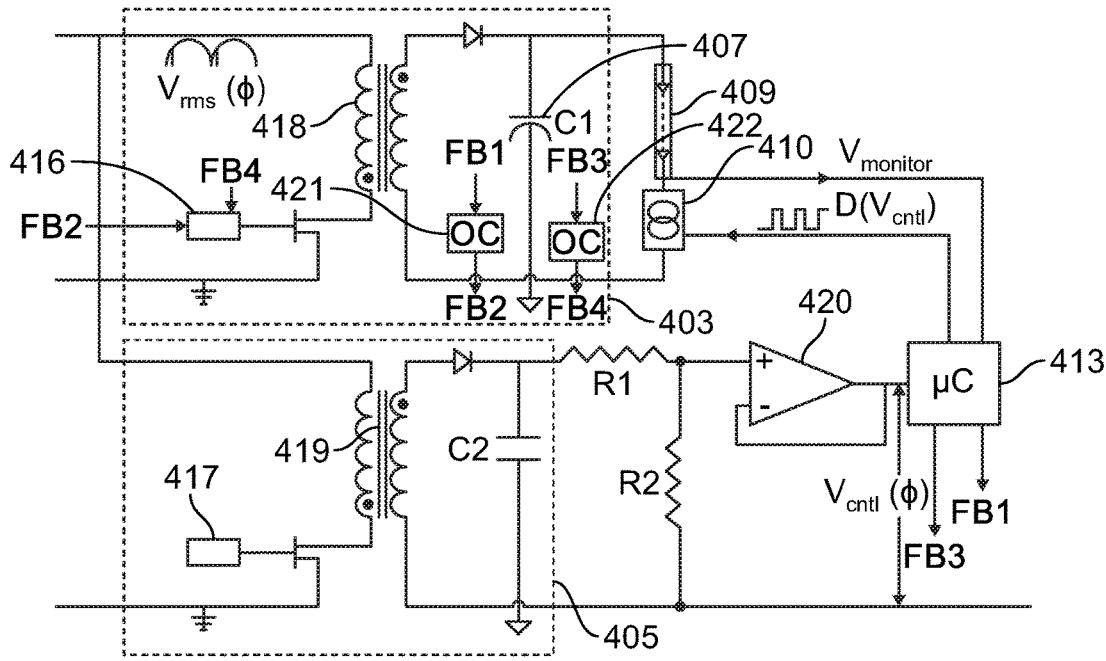
Figure 4B:
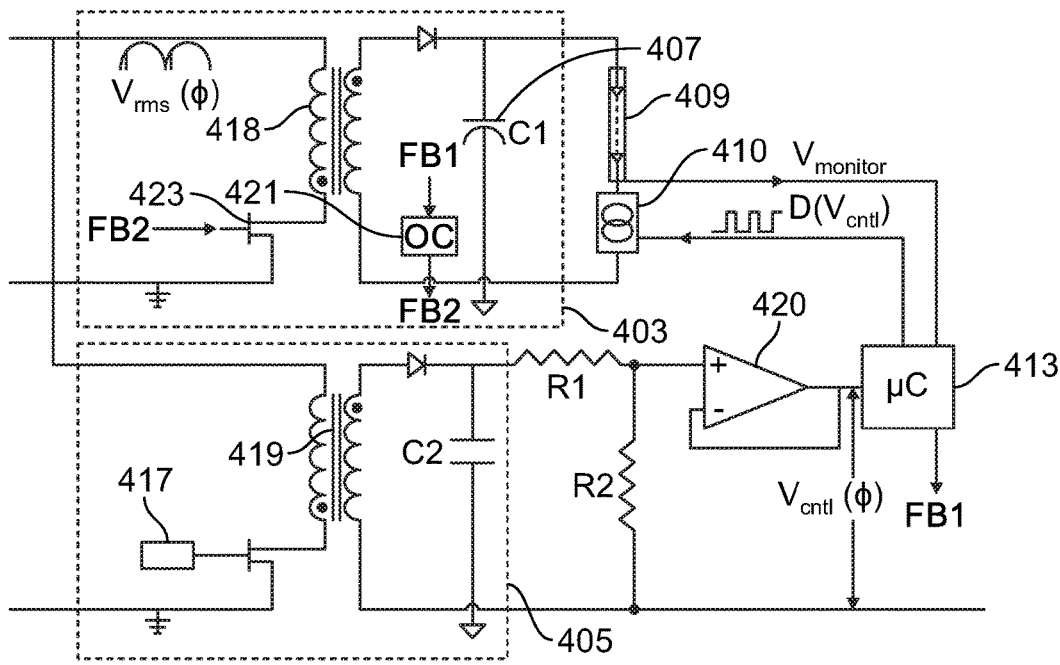
Figure 5:
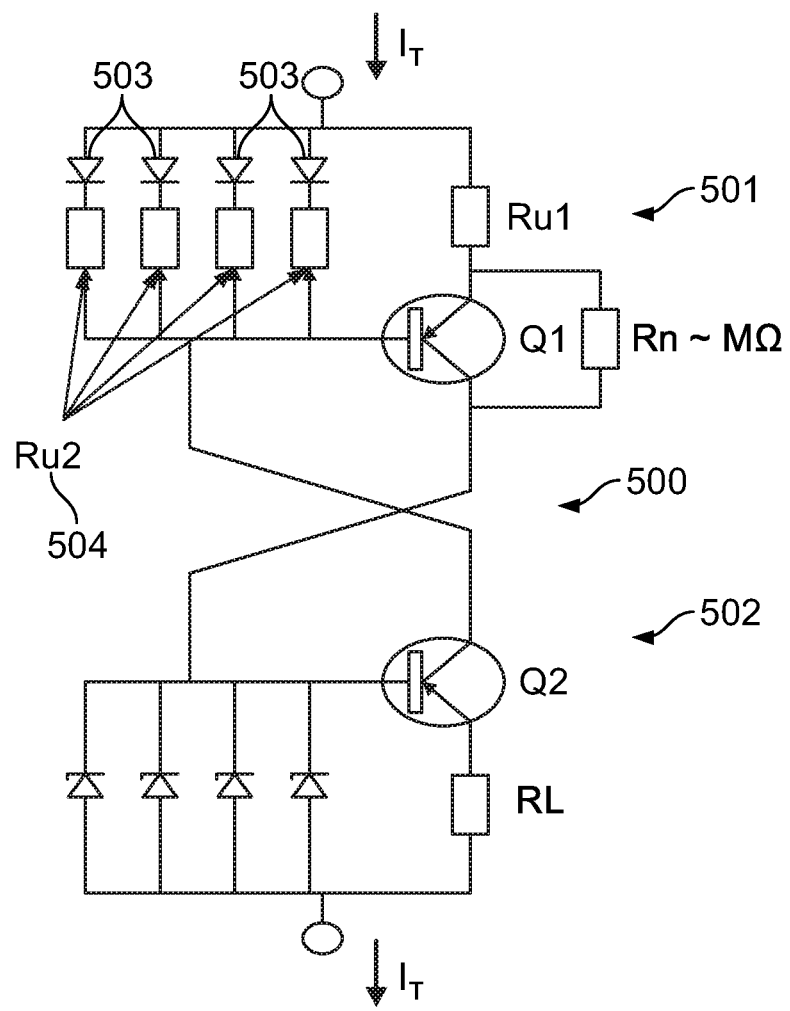

FIGS. 4(a) and 4(b) illustrate in more detail the circuit elements of embodiments of the present invention, wherein features are implemented in hardware and software respectively; and FIG. 5 shows a simplified circuit for a current regulator, suitable for use in some embodiments of the present invention.

Figure 1:
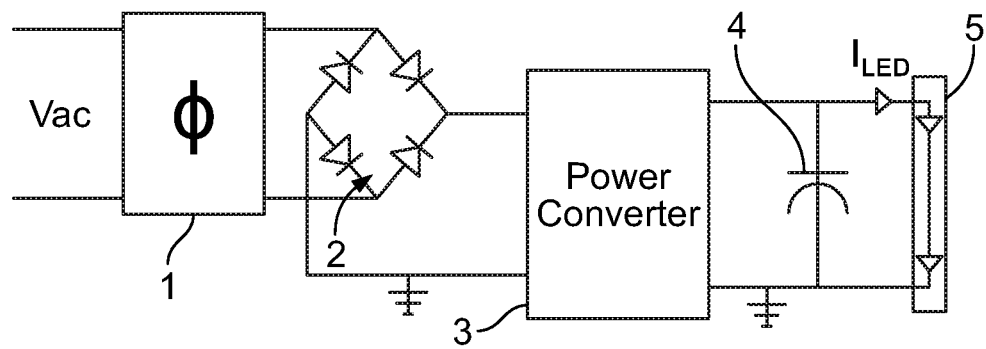
FIG. 1 illustrates in simplified block diagrammatic form a power conversion circuit for driving a LED lighting unit from an AC (e.g. mains) voltage.
Figure 2:
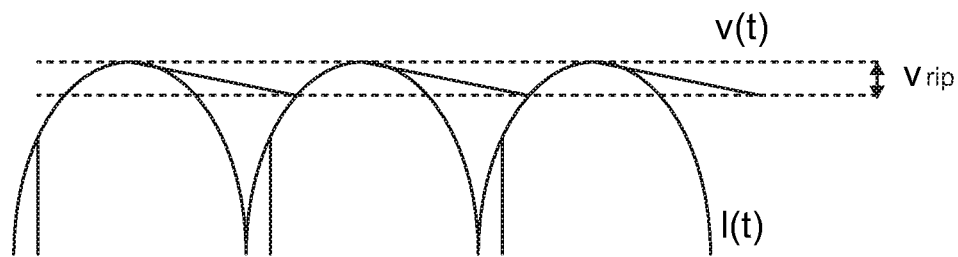
FIG. 2 shows a graph of a voltage waveform associated with a part of the circuit of FIG. 1.
Figure 3A:
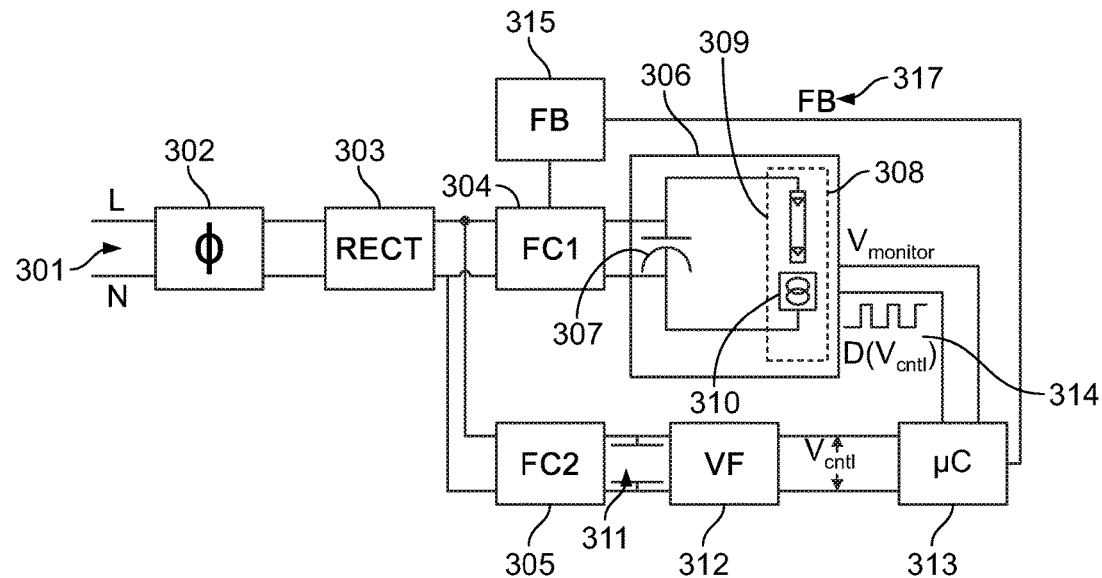
FIG. 3a illustrates in block diagrammatic form a first embodiment of the present invention.

FIG. 3a shows the functional block diagram of a dimmable LED lighting ballast according to an embodiment of the present invention, operating from an AC power supply having some form of modulation, such as phase cutting, wherein said phase cutting may be achieved through the use of either a leading-edge phase cutter or trailing-edge phase cutter. The action of a leading-edge phase cutter is illustrated in the input voltage waveform of FIG. 2, where each half-cycle of the AC input voltage is blanked-out, or cut, from the low phase-angle end. In the case of a trailing-edge phase-cutter, each half-cycle of the AC voltage waveform is cut from the high phase angle end. Throughout the following summary, the action of a ballast based on the functional block diagram in FIG. 3 will be explained by reference to the use of a leading-edge phase cutter. It should, however, be clear to a person normally skilled in the art, that an equivalent set of operational conditions and overall operational algorithm exists in the case of a trailing-edge dimmed ballast of the same invention.

Referring to FIG. 3a an input AC supply voltage (301) is provided to a full-wave rectifier (303) via a phase cut dimmer (302). The resulting full-wave rectified voltage is then provided to two flyback converters, (304) and (305). A primary Flyback converter (304) provides a switch-mode converted current to a load (306) comprising a parallel combination of a smoothing capacitor (307) and a current-regulated load (308) where the current-regulated load (308) in turn comprises an LED load (309) and a dimmable DC current, or drive current, regulator (310) connected in series with the said LED load. The primary converter (304) operates under normal conditions at a switch mode frequency of several tens of KHz or higher, and thus any ripple appearing across the load at these frequencies is of no consequence as regards perceptible flicker.

An auxiliary Flyback converter (305) provides a switch-mode converted charging current to a parallel combination of a second capacitor (311), a fixed resistive load (not shown), and a voltage-follower (312) for buffering purposes. As the converter feeds a fixed resistive load, the voltage appearing across this load is related to the power, and hence the degree of phase cutting, being applied to the AC signal. This voltage therefore acts as a measure of the degree of dimming as demanded by a user by adjustment of a dimming switch.

The DC voltage output by the said voltage-follower (312) is then fed to a microcontroller (313) which is arranged to measure, using an analogue to digital converter (ADC) input, the voltage across the resistive load, as buffered by the voltage follower. The microcontroller (313) is then arranged to provide an output PWM waveform (314) having a duty cycle D responsive to the measured voltage, to a switch, or a dimming control input of current regulator (310) where the frequency of the said PWM waveform is sufficiently high to avoid the generation of directly or indirectly perceivable flicker within the LED load (309). The microcontroller provides, in an embodiment of the invention, a 1:1 transfer function $D(V_{cntl})$ between the duty cycle, D of the PWM waveform and the control voltage $V_{cntl}$, fed to the microcontroller.

The microcontroller (313) is connected also to a point between the LED load and the current regulator, and is arranged to measure, again using an ADC input, the voltage appearing at that point. This voltage provides a measure of the DC voltage across the current regulator.

One or more outputs (317) from the microcontroller are provided, back to the primary switch mode converter, which act as one or more feedback signals via feedback isolation and level shifting means (315) to control the output of the primary converter, as described in more detail below.

Figure 3B:
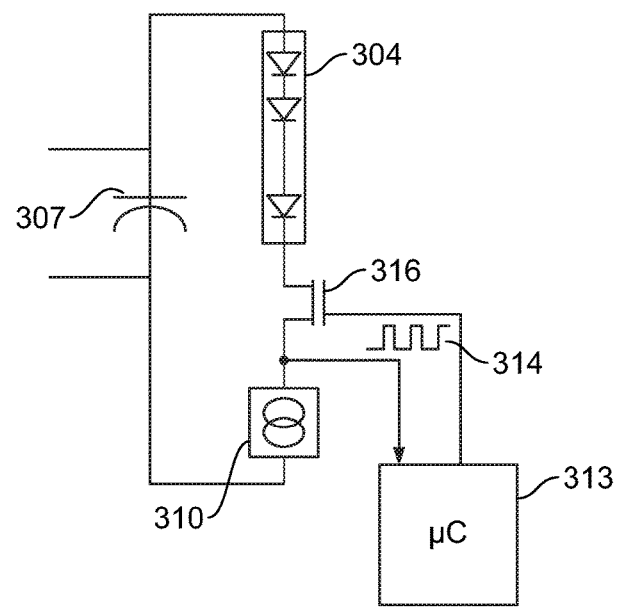

The current regulator may be modulatable (i.e. dimmable) by any suitable means. FIG. 3b shows in more detail how a current regulator may be modulated in an embodiment of the invention. Such a means for dimming the current regulator may be used in the embodiment of FIG. 3a, and may also be used with other embodiments described herein, as would be clear to a person normally skilled in the art. An LED load (309) similar to that described in relation to FIG. 3a is shown in series with current regulator (310). Located between the load (309) and regulator (310) is a MOSFET switch (316). The switch has an input on its gate connection from the microcontroller (313), with the microcontroller providing its PWM output to the gate input. The MOSFET switch is used to provide a direct connection between the current regulator (310) and the LED load (309) when the PWM waveform is in its ON state, and to electrically disconnect the LED load from the current regulator when the PWM waveform is in its OFF state.

Referring to both FIGS. 3a and 3b, in operation, during each ON-state period of the PWM waveform (i.e. when the microcontroller has switched the switch (316 of FIG. 3b) on), the microcontroller also sends a voltage feedback signal to the primary converter, so controlling its switching operation in such a manner as to keep the voltage measured across the current regulator (310) constant, to within the accuracy provided by the control loop comprising (304) (313) and (315).

The feedback signal from the microcontroller to the converter (304) is provided with isolation using an optical isolator (315) to provide further isolation between the high voltage input side and the lower voltage output side of the ballast.

Due to the action of the auxiliary flyback converter (305) and the voltage follower (312) a 1:1 transfer function $V_{cntl}(\phi)$ is also provided, between the control voltage, $V_{cntl}$ and the phase-cut angle, $\phi$. Consequently, the combined action of elements (305) (310) (311) (312) and (313) provides a 1:1 transfer function $D(\phi)$ between the duty cycle, D of the PWM current dimming waveform and the phase-cut angle, $\phi$. This scheme implemented in this embodiment therefore provides a significant degree of freedom in the definition of the dimming profile $D(\phi)$. This degree of freedom can be exploited in two ways. Firstly, the dimming function $D(\phi)$ can be linear, geometric, or a combination of the two. Secondly, as is demonstrated later, such a mapping function can be adaptive, through the action of the microcontroller (313) in such a way as to map the available current dimming range of the dimmable current regulator (310) to the phase-cut angular range of the phase-cut dimmer (302).

As is illustrated later, the dimmable current regulator (310) is preferably of a type that exhibits high differential impedance, thereby suppressing current ripple in the LED load. Such current ripple can arise as a result of either voltage ripple across the smoothing capacitor (307) or, in an LED ballast according to the features of the present invention, a controlled hiccup mode, wherein, during dimmed operation, the voltage across capacitor (307) is allowed to vary between a maximum value and a minimum value, through the pulse-wise injection of charge into capacitor (307) by the flyback converter (304) wherein the action of (304) is controlled by the microcontroller (313) in response to the measurement, during each ON-state of the PWM dimming waveform, of the voltage across the dimmable regulator (310). Such a controlled hiccup mode is employed in ballasts according to embodiments of the present invention, in order to counter the effect, experienced by most LED ballasts, of reduced power supply efficiency and accompanying increases in LED flicker, during deeply dimmed operation, as previously mentioned.

The auxiliary converter arrangement of FIG. 3a is used to generate a control voltage related to the degree of modulation imposed on the rectified AC signal by a dimmer switch. Embodiments of the invention may be provided that generate the control voltage in different ways. An embodiment of the invention therefore comprises an arrangement as shown in FIG. 3a, but wherein the auxiliary controller and voltage follower are replaced by a digitiser for digitising the modulated, rectified AC signal, following suitable scaling. The digitiser is arranged to sample the AC signal at a rate sufficient to allow subsequent processing to measure the RMS voltage of the modulated AC signal to an accuracy dependent upon the desired optical dimming quantisation levels. The RMS voltage level is then used to generate the PWM signal controlling the current regulator as before.

The normally skilled person will be aware that other ways of determining the degree of modulation (e.g. the degree of phase cutting) applied to the AC signal exist, and may be used without departing from the nature and scope of the present invention.

Further details of the feedback control of the flyback converter and of the controlled hiccup mode when dimming are provided below.

FIGS. 4(a) and 4(b) show simplified circuit schematics relevant to a family of embodiments of the present invention. The embodiments are functionally similar to that of FIG. 3(a), and operation of the various elements common to both FIGS. 3(a) and 4(a) will generally be of a similar nature, whereas FIG. 4(b) differs in having some features implemented in software rather than hardware. As will be described later, the members of the family of embodiments vary according to the nature of the transfer function (dimming profile) $D(\phi)$.

Shown in FIG. 4(a) is a ballast wherein the main components comprise a main flyback converter (403), an auxiliary flyback converter (405), current regulator (410), LED load (409) and microcontroller (413). These are arranged in a similar fashion to the corresponding components in the embodiment shown in FIG. 3(a). The Microcontroller (413) has analogue inputs $V_{cntl}(\phi)$ and $V_{monitor}$ from the output of the auxiliary flyback converter, via a voltage follower buffer circuit (420), and from the voltage at the current regulator (410) respectively. The microcontroller (413) provides a switching PWM output to the current regulator, and two feedback signals to the main flyback converter (403). A shallow-mode feedback signal, FB1 is fed to an optical isolator (421), with the opto isolated output FB2 then connected to main converter (403) to control PWM parameters thereof. An interrupt feedback signal FB3 from the microcontroller is fed to optical isolator (422) with the opto isolated output FB4 connected to main converter (403) to control an interrupt function of the converter. The inputs fed by FB3 and FB4 are more specifically fed to a power factor controller (416) within the main converter (403).

In the family of illustrative embodiments represented by FIG. 4(a), the drive current regulator (410) can take the form of two regulators in parallel, each of the type disclosed in aforementioned patent application WO2013/005002, which, as well as providing a DC current regulation function, also provide high differential impedances, thereby reducing the current ripple in the LED load (409) arising as a result of voltage ripple across the smoothing capacitor (407) to a low level (typically around 0.1%, for a peak-to-peak voltage ripple of 3.5 Volts in certain embodiments thereof). The use of such a regulator with high differential impedance also leads to the suppression of current ripple arising as a result of controlled hiccup moding within the power converter (403) under the control of microcontroller (413). In both undimmed operation and during shallow-dimming, the mean voltage across the said drive current regulator is maintained at a substantially constant level, slightly above its knee voltage, through the action of the opto-coupler (421) which, in response to a control signal, FB1 from the microcontroller (413) provides a feedback signal, FB2, to the main Power Factor Correction Controller (416) in response to which, the said Power Factor Correction Controller alters its switching characteristics (combination of on-time, off-time, frequency) in order to maintain the said substantially constant voltage across the current regulator. During deep-dimming, however, depending upon the nature of the dimming profile, $D(\phi)$ there will be a dimming depth, below which, the power taken by the load, comprising the series combination of the LED cluster (409) and the current regulator (410) will be less than the power available from the power converter (403) and where countering this by altering one or more of the switching parameters of Power Factor Controller (416) would give rise to a significant reduction in the efficiency of power converter (403). At that point, and for any dimming depth greater (deeper) than this, the power converter (403) is placed into a controlled hiccup mode, under the control of the Microcontroller (413). Such a controlled hiccup mode is actuated by means of an interrupt control signal, FB3, sent by the Microcontroller (413) when the PWM duty cycle generated by the Microcontroller is below a level (typically between 10% and 50% and preferably 30%) below which the efficiency of power converter (403) is known to fall to more than 10 percentage points below its undimmed value.

The controlled hiccup mode in this embodiment is characterised in that the microcontroller (413) when required to reduce the duty cycle of the dimming PWM signal below a level at which the efficiency of the power supply (403) is known to fall by more than around 10 percentage points, allows the voltage across the current regulator to increase to a pre-determined maximum level, $V_{chm}$(Max) before sending, via a second opto isolator (422) a feedback signal, FB4, at a level that provides an interrupt signal to the switch-mode controller (403). During the period when FB4 is held at this level, no charge is supplied to capacitor (407) by power supply (403). Consequently, during this period, the voltage across capacitor (407) falls and therefore, the voltage across regulator (410) also falls. When the voltage across regulator (410) as detected by the microcontroller (413) falls to a pre-determined minimum, $V_{chm}$(Min) the microcontroller (413) removes the interrupt and the controlled hiccup mode begins again.

The maximum and minimum current regulator voltages used during controlled hiccup mode, $V_{chm}$(Max) and $V_{chm}$(Min) are chosen to encompass a range of voltages across which the current regulator (410) gives a high differential impedance. In an illustrative example, where the current regulator (410) has a knee voltage of 6V, and where it is known to give a high differential impedance over a 2:1 voltage range, beginning at this knee voltage, $V_{chm}$(Max) and $V_{chm}$(Min) would typically be chosen as 12V and 8V respectively.

An example of a flyback converter that incorporates a built-in Power Factor Correction Controller that can be interrupted in this fashion is provided by Linear Tech's LT3799—through use of the INTVcc pin.

FIG. 4(b) illustrates a further embodiment of the present invention, wherein like numerals refer to equivalent or similar features as shown in FIG. 4(a). Operation is generally similar to that of FIG. 4(a) except as described below, and hence a full description of its operation is not provided. In this embodiment, the power factor controller (416) within the main switch-mode converter (403) of FIG. 4(a) is eliminated, through the transfer of the switch-mode control software for the converter (413) from the power factor controller (416) of FIG. 4(a) to the Microcontroller (413). In such an embodiment, the signal fed from the Microcontroller (413) to the main flyback converter (403) takes the form of a PWM voltage waveform applied to the gate terminal of the switch-mode FET (423) of the flyback converter (403) via opto-isolator (421). In the case of such an embodiment, the interrupt function is implemented by means of a software interrupt feedback signal, whereby the PWM waveform applied to FET (423) is interrupted within the said switch-mode control software, in response to the measurement during each ON-state of the PWM dimming waveform, of the voltage on the dimmable regulator (410). Therefore, in the embodiment illustrated in FIG. 4(b) the hardware interrupt feedback shown in FIG. 4(a) as feedback FB3, Opto-isolator (522) and feedback FB4, is eliminated.

The normally skilled person will appreciate that opto-isolator 421 shown in FIG. 4(b) may be eliminated in circumstances where the drain to gate feedback isolation of the switch-mode FET (423) is sufficient to provide isolation of the Microcontroller (413) from signal surges and voltage spikes, occurring at the input to the ballast.

In applications requiring high ballast efficiency at low LED load voltages, it is appreciated by the inventor that the precise regulator architecture disclosed in WO2013/005002 represents a non-ideal solution, having as it does, a knee voltage of around 6V. In order, therefore, to accommodate a peak-to-peak voltage swing of around 1 V, the current regulator would need to be operated, in undimmed conditions, at a voltage of just above 7 V. Such a regulator would therefore be operated with a voltage across it maintained, in undimmed operation, at around 8V. In view of the fact that the primary switch mode converter (403) may preferably operate, at full load, with an efficiency of around 95%, in order for the entire ballast to have an efficiency greater that 85% for all loads, the regulator would need to be operating at an efficiency of at least 89.5%. The operational efficiency of the current regulator is given simply by the ratio of the LED load voltage, to the total voltage dropped across the LED load and the regulator. It can therefore, easily be calculated, that the minimum LED load voltage necessary to ensure that an overall efficiency of at least 85% is achieved for the ballast, when using the precise regulator architecture disclosed in WO2013/005002, is 68 V.

For an application requiring an LED load power, when undimmed, of around 10 Watts—typical for an A19 or similar LED bulb replacement for a 60 W input incandescent—it is more usual for the LED load to operate at a voltage of 48V and correspondingly, an LED current of 208 mA. For such an application, using a ballast of the present invention would require the current regulator to have a lower knee voltage, in order to maintain high efficiency.

FIG. 5 shows a current regulator (500) based on the overall architecture disclosed in WO2013/005002. This shows a pair of elemental current regulators (501, 502), with the first elemental regulator (501) cross coupled to the second elemental regulator (502), similar in basic structure to the embodiment of FIG. 6 of WO2013/005002. In the present variant of the current regulator, a parallel stack of series-connected silicon diodes (503) and resistors replaces a parallel Zener stack in one of the elemental regulators of the referenced device. In this manner, through appropriate selection of component values, a significantly reduced knee voltage can be obtained.

Using the current regulator architecture of FIG. 5 of the present application, a knee voltage of around 4.2V can be achieved, using the following resistor values, together with standard Silicon rectifier diodes, and with four Zener diodes in the parallel Zener stack, whereby each Zener diode carries a current of 25 mA and has a Zener voltage at this current of 3 V:
RL=22Ω, Ru1=4.8Ω, Ru2=15.2Ω

These values relate to the circumstance where each Silicon rectifier diode has a voltage drop of 0.8V and where the base-emitter voltage of each bipolar transistor is 0.7V.

The modified current regulator architecture of FIG. 5 can, through the appropriate selection of resistor values, number of rectifier diodes and Zener diodes, be used to address a range of currents required for low-voltage ballasts of the present invention, where the upper end of such range is determined primarily by the current handling capabilities of the PNP and NPN bipolar transistors.

Referring to the overall ballast architectures of FIGS. 4(a) and 4(b), if the efficiency of the primary converter (403) is around 95% then, using a value of 220 µF for smoothing capacitor (407) the peak-to-peak ripple voltage across capacitor (407) at a constant DC load current of 208 mA will be, to a good engineering approximation, 2.6V. This allows the regulator to be operated at around 1.4V above its knee voltage, with sufficient margin to ensure that throughout the voltage ripple, it remains within its high differential impedance region (i.e. above its knee voltage). This means that a current regulator of this type, operated within the architecture of the present invention, would be operated at a regulator voltage of 5.6V. For an LED load voltage of 48V, this corresponds to a regulator efficiency of (48/(48+5.6))×100%, namely 89.6%. This in turn, gives an overall efficiency for the ballast, of 95% of 89.4%, namely 85%.

Such a ballast, operating at this current level would require only one current regulator of the type disclosed. Consequently, the current regulator will have a differential impedance of around 10KΩ. Therefore, the peak-to-peak voltage of 2.6V experienced by the regulator in this example, would give rise to a peak-to-peak current ripple of 0.26 mA (0.125% of the LED current) corresponding to a percentage flicker at 100-120 Hz, of 0.05%.

Similarly, the 4 Volt peak-to-peak voltage swing experienced during controlled hiccup mode would give rise to a peak-to-peak current ripple of around 0.4 mA, equating to a percentage peak-to-peak current ripple of 0.2%. This in turn corresponds to a flicker percentage in the light emitted by the LED load, of 0.1%.

The same modified current regulator would also be suitable for use in lamps using higher LED load voltages, and correspondingly lower LED currents. For example, if the LED load voltage is 100V, and the LED current is 100 mA—again giving an LED load power of 10 W—and the smoothing capacitor (407) is 122 µF, then the peak-to-peak voltage ripple across the smoothing capacitor would again be 2.3V. The current regulator is therefore again, as in the previous example, operated at a voltage of 5.5V, leading to a regulator efficiency of (100/(100+5.5))×100%, namely 94.8%. This, together with the 95% efficiency of the flyback converter, would lead to an overall ballast efficiency of 90%. Furthermore, the peak-to-peak current ripple at 100-120 Hz in the LED load would be 0.23 mA as before, corresponding to 0.2% of the LED current, thereby giving a flicker percentage of 0.1%.

It should be appreciated by a person normally skilled in the art, that ballasts according to the present invention could incorporate, in the manner outlined above, other types of current regulator that possess the same or broadly similar differential impedance and dimming capabilities as those outlined above whilst still providing a good performance, and that other current regulators of lesser performance may also be used, while still providing an adequate (albeit reduced) performance.

In the same family of preferred embodiments of the present invention, the main flyback converter (403) is provided with a Power Factor Correction (PFC) functionality by use of a Power Factor Correction Controller (416) which can use a constant on-time, constant off-time, or any similar switch-mode primary control function, or combination of functions, for the purposes of maintaining high Power Factor. By contrast, the auxiliary flyback converter (405) preferably uses a constant on-time controller (417). This difference in switch-mode control actuation ensures that whilst the Power Factor of the overall ballast can be controlled, and thereby maximised, the auxiliary circuit, comprising the auxiliary flyback converter (405) the resistive divider R1, R2, and the voltage follower (420) provides a DC voltage output $V_{cntl}$ that is directly related to the phase-cut angle, ϕ.

By consideration of the operational modes of the two flyback converters, and in each case applying conservation of charge over the mains AC cycle, the peak of the average secondary current for each (drawn through the secondary winding inductors of the main flyback transformer (418) and the auxiliary flyback transformer (419)) can be expressed as:

$$\langle I_{sec1}\rangle, p = K \cdot \pi \cdot I_{reg,0} \cdot \frac{D}{\cos(\varphi)+1} \qquad \text{(Equation 1)}$$

And $$\langle I_{sec2}\rangle, p = K \cdot \pi \cdot \langle V_{c2}\rangle / ((R1+R2) \cdot (\cos(\varphi)+1)) \qquad \text{(Equation 2)}$$

Wherein:
For ϕ≤90 degrees, K=1
For ϕ>90 degrees, K=Sin(ϕ)
$\langle I_{sec1}\rangle$,p is the peak average secondary current in the flyback transformer (418) of the main flyback converter
$\langle I_{sec2}\rangle$,p is the peak average secondary current in the flyback transformer (419) of the auxiliary flyback converter
$I_{reg,0}$ is the undimmed value of the regulated LED current, controlled by the current regulator (410)
D is the duty cycle of the PWM waveform applied to the current regulator (410)
ϕ is the cut-angle of the full-wave rectified voltage waveform at the input to the ballast, for the case where the said waveform has, prior to rectification, been subjected to leading-edge dimming
$\langle V_{c2}\rangle$ is the time-average voltage across capacitor, C2

The time-average voltage across capacitor, C2 is applied, via a resistive divider comprising resistances R1 and R2, to the non-inverting input of a voltage follower (420). The action of such a voltage follower is to provide a DC output, $V_{cntl}$, which will follow $\langle V_+\rangle$ (the time-average voltage across R2) for values of $V_+$ in the range 0 to $V_{r,vf}$, where $V_{r,vf}$ is the rail supply voltage provided to voltage follower (420).

In view of the fact that the auxiliary flyback converter (405) uses a constant on-time and constant switching frequency, the peak average secondary current $\langle I_{sec2}\rangle$,p is given by:

$$\langle I_{sec2}\rangle, p = K \cdot V_p \cdot t_{on}^2 \cdot f_{sw} / (2 \cdot L_{p2} \cdot n_2) \qquad \text{(Equation 3)}$$

Wherein:
$V_P$ is the peak voltage of the full-wave rectified voltage waveform
$t_{on}$ is the constant on-time of the switch-mode controller (417)
$f_{sw}$ is the constant switching frequency of the switch-mode controller (417)
$n_2$ and $L_{p2}$ are in turn, the turns ratio (output to input) and primary inductance of the flyback transformer (419) of the auxiliary flyback converter (405).

Combining Equations 2 and 3, and in sight of the operation of voltage follower (20) the control voltage, $V_{cntl}$, can be expressed as a function of cut-angle ϕ:

$$V_{cntl}(\varphi) = R2 \cdot V_p \cdot t_{on}^2 \cdot f_{sw} \cdot \frac{\cos(\varphi)+1}{2 \cdot \pi \cdot n_2 \cdot L_{p2}} \qquad \text{(Equation 4)}$$

In view of the fact that equation 2 is derived from conservation of charge over a mains cycle, the expression given in equation 4, providing the mapping function between $V_{cntl}$ and $\phi$, is identical for leading-edge and trailing edge dimming, making the control voltage independent of dimmer type.

In response to this voltage input, the microcontroller (413) adjusts the duty cycle of the PWM waveform, according to an algorithm provided through a pre-loaded look-up table within the microcontroller. The said algorithm provides the 1:1 mapping between duty cycle, D and $V_{cntl}$ and therefore, via equation 4, between D and $\phi$.

An example of such an algorithm is given by Equations 5 and 6. This is a specific example of a so-called 'logarithmic' or more accurately, geometric profile, where D=1 when $\phi=\phi_{min}$ and D=$D_{min}$ when $\phi=\phi_{max}$.

$$D(\varphi)=10^{f(\varphi)} \qquad \text{(Equation 5)}$$

Where:

$$f(\varphi) = (\varphi - \varphi_{min}) \cdot \frac{\log D_{min}}{\varphi_{max} - \varphi_{min}} \qquad \text{(Equation 6)}$$

Through the combination of Equations 5 and 6 with Equation 4, a transfer function is constructed, between the cut-angle, $\phi$, the control voltage $V_{cntl}$ fed to the microcontroller and the PWM duty-cycle provided by the microcontroller.

Current regulators based on the architecture of FIG. 5 may, in some embodiments, achieve dimming, through the methods described herein, down to 0.1%, and in some cases even further. Through the use of an algorithm contained within the Microcontroller (413), in the form of a look-up table, or collection of look-up tables, the entire dimming range of 100% regulated current, down to 0.1% of regulated current, can be mapped on to the phase-cut angle range of a leading or trailing-edge dimmer. Furthermore, due to the high differential impedance of the current regulator described herein, together with the use of the controlled hiccup mode described herein, low levels of photometric flicker can be achieved throughout the entire range of a dimmer switch, regardless of whether the dimmer switch provides leading or trailing edge dimming.

It is desirable for the ballast to be able to adjust its operations, in order to map its available dimming range onto the phase-cut angle range of a phase-cutting dimmer to which it is connected, without prior knowledge of this angular range. This ensures that the dimming profile of the ballast exhibits no 'dead travel' at either end of the dimming range. The following discussion details how this can be achieved.

Adaptive Dimming:

Within any given country, or region within which a nominal mains RMS voltage is defined, such as 230V in the UK, there is some variability between properties (typically of order +/−10%) in the actual mains voltage delivered. In addition to this, variations exist between phase-cut dimmers, in terms of the minimum and maximum values of cut-angle, $\phi_{min}$ and $\phi_{max}$. These can lie, for typical commercially available phase-cut dimmers, between around 5 and around 90 degrees or more for $\phi_{min}$ and between around 100 and 179 degrees for $\phi_{max}$.

An emerging requirement in retro-fit LED lighting equipment is for such equipment to be compatible with the range of commercially available and pre-installed phase-cut dimmers. This implies, amongst other things, the need for ballasts to be able to operate across their full dimming range, where the said range is mapped in any particular case, to the phase-cut angle range of the dimmer to which the ballast is connected. In the context of the circuit architecture of an isolated ballast, this implies a need for the architecture to provide a voltage, or current, which is used in controlling the dimming function. A strategy for ensuring compatibility would then involve the detection of such voltages or currents that lie outside a pre-assumed, minimum, range and the re-mapping of the dimming function in such a way as to accommodate the new maximum and minimum values of the detected voltage or current. In the context of a ballast according to the present invention, the voltage $V_{cntl}$ can be used to affect such a re-mapping process, thereby providing wide-ranging and preferably universal dimmer compatibility. The process would involve initially centering the transfer function $V_{cntl}(\phi)$ onto a minimum range of values of $\phi$ $(((\phi)_{min})_{assumed}$ to $((\phi)_{max})_{assumed})$ and then upon detecting values of $V_{cntl}$ that lie outside the corresponding range $(V_{cntl,max})_{assumed}$ to $(V_{cntl,min})_{assumed})$ proceed to re-map the function $V_{cntl}(\phi)$ across the newly-encountered range of $\phi$. Similarly, the function $D(\phi)$ would be re-mapped over the new range of $\phi$.

In its initial state (before a lamp, or separate ballast, is installed into a lighting system) the algorithm loaded into the microcontroller assumes that the range of $V_{cntl}$ to be received by the microcontroller is that which, for the known values of $n_2$, $t_{on}$ and $L_{p,2}$ and an assumed value of Vp, corresponds to a minimum phase-angle range ($\phi_{min}$ to $\phi_{max}$) where $V_{cntl}$ has its minimum value when $\phi=\phi_{max}$ and has its maximum value when $\phi=\phi_{min}$. The algorithm then maps the dimming range of the current regulator and therefore of the ballast ($D_{min}$ to 1) onto this initially assumed range of $V_{cntl}$.

Following installation, if the Microcontroller receives a value of $V_{cntl}$ that lies outside of this initially assumed range, the algorithm is re-mapped, such that the minimum PWM duty cycle, $D_{min}$ is mapped onto the new maximum value of $V_{cntl}$, and the maximum PWM duty cycle (i.e. unity) is re-mapped onto the new minimum value of $V_{cntl}$.

By using the architecture of FIG. 4(*a*) or 4(*b*), wherein the auxiliary flyback converter uses a constant on-time controller, and where the current regulator has a known dimming range, variations between dimming switches, in parameters Vp, $\phi_{min}$ and $\phi_{max}$ can be accommodated, whilst achieving full-range dimming, regardless of whether the dimmer switch uses a leading-edge or trailing-edge dimming method.

Note that, although embodiments of the invention have been presented having a flyback converter as the primary or auxiliary switch mode converter, it will be appreciated by a person of ordinary skill in the art, that equivalent circuit topologies exist, and may be substituted therefore, without changing the nature of the invention, and without requiring any inventive activity. For example, Buck converters or Boost converters may be used, and the normally skilled person will appreciate any design implications thereof, and any changes and modifications required.

Note also that the term Light Emitting Diode, and LED refers to light emitting diodes of all types, including semiconductor and organic LEDs, that may be configured to generate radiation in the visible, the infra-red and/or the ultra-violet wavelengths.

Note that, although the invention is described largely in the context of use with an LED lighting system, it will also have application in other areas where power to a load needs to be controlled across a particular large range of input powers, using a phase cutting technique or other technique to reduce the AC power fed to the switch mode converter.

The invention claimed is:

1. A ballast for converting a rectified AC input into a drive current output, said ballast comprising:
   a primary switch-mode converter, arranged to provide a charge to a capacitor, the converter having an interruption means, to interrupt the converter's regular switch mode operation, and means to control its internal pulse width modulation parameters;
   a current regulator which, in use, is in series with a load, said regulator and load being in parallel with the capacitor;
   means for determining a desired degree of power modulation to be applied to the drive current output
   a monitoring system arranged to monitor a voltage across the current regulator, and
   an interrupt feedback means for providing a feedback signal to the interruption means, and arranged to interrupt the primary switch-mode converter, based upon the monitored voltage across the current regulator,
   wherein the interrupt feedback signal is arranged to interrupt the primary switch-mode converter when the degree of modulation to be applied to drive current output reaches a given threshold.

2. A ballast as claimed in claim 1 wherein the desired degree of power modulation to be applied to the drive current output is set by a power modulation applied to the AC signal.

3. A ballast as claimed in claim 2 wherein the control voltage generation system is arranged to provide an analogue control signal to the current regulator.

4. A ballast as claimed in claim 2 wherein the shallow-mode feedback signal, is arranged to control said switching parameters of the primary converter to stabilise the time-averaged voltage across the current regulator dependent upon the modulation applied to the AC signal.

5. A ballast as claimed in claim 2 wherein the shallow feedback signal is arranged to control the switching frequency and/or pulse width of the converter using a power factor correction facility on said converter.

6. A ballast as claimed in claim 2 wherein, in use, the modulation applied to the AC signal is produced by a phase cutting dimmer.

7. A ballast as claimed in claim 6 wherein the shallow-mode feedback signal is arranged to be operative when the phase cutting dimmer is set to produce relatively low degrees of phase cutting, and the interruptor feedback is arranged to become operative when the degree of phase cutting reaches a threshold value.

8. A ballast as claimed in claim 1 wherein the interrupt feedback signal is produced by a control voltage generation system, said control voltage generation system being further arranged to produce a shallow mode feedback signal, said shallow mode feedback signal being arranged to control PWM switching parameters of the primary switch mode converter based upon the voltage monitored across the current regulator.

9. A ballast as claimed in claim 1, said ballast further incorporating a load modulator for modulating the current flowing through the load based upon the degree of modulation applied to the AC signal.

10. A ballast as claimed in claim 9 wherein the load modulator is a pulse width modulator.

11. A ballast as claimed in claim 10 wherein the threshold at which the interrupt feedback signal becomes operative is when the duty cycle of the PWM signal applied to the load modulator falls to a level of between 50% and 10%, and more preferably when it falls to approximately 30%.

12. A ballast as claimed in claim 9 wherein the means for monitoring the degree of modulation to be applied to the drive current output comprises an auxiliary switch-mode converter, having a capacitively smoothed output where the said auxiliary switch mode converter has as its input the modulated full wave rectified AC input signal and provides a signal responsive to the degree of modulation applied to the AC input.

13. A ballast as claimed in claim 9 wherein the means for monitoring the degree of modulation to be applied to the drive current output AC signal comprises an analogue to digital converter (ADC) arranged to sample the modulated AC signal.

14. A ballast as claimed in claim 1 wherein the interruption means is arranged, when fed with an appropriate feedback signal, to switch off the regular switch mode operation of the primary converter.

15. A ballast as claimed in claim 1 wherein the interrupt feedback signal is tuned to attempt to maintain the voltage across the current regulator between predetermined minimum and maximum voltages, said voltages being selected as allowing the current regulator to maintain a differential impedance above a predetermined minimum value.

16. A ballast as claimed in claim 1 wherein the interrupt feedback signal takes the form of a logical feedback signal generated within software residing within a processor, where the said software also generates the PWM switching waveform for the primary switch-mode converter and where the PWM switching waveform is interrupted by the interrupt feedback signal.

17. A ballast as claimed in claim 1, wherein the current regulator has a differential impedance greater than 500Ω, and more preferably greater than 1 kΩ, and even more preferably greater than 2 kΩ.

18. A ballast as claimed in claim 1 wherein the current regulator has a knee voltage of between 4V and 4.5V, and more preferably approximately 4.2V.

19. A ballast as claimed in claim 1 wherein the load comprises a light emitting diode (LED) light source.

20. A ballast as claimed in claim 1 wherein the primary switch mode converter is a flyback converter.

21. A ballast as claimed in claim 1 wherein the primary switch mode converter is a buck converter.

22. A ballast as claimed in claim 1 wherein the primary switch mode converter is a boost converter.

23. A ballast as claimed in claim 1 wherein the monitoring system for monitoring the voltage across the current regulator, and the control voltage generation system are implemented using a microcontroller.

24. A ballast as claimed in claim 1 wherein the means for determining the desired degree of power modulation to be applied to the drive current output comprises means for measuring an external input signal that varies according to the degree of modulation required.

25. An illumination apparatus incorporating a ballast as claimed in claim 1.

26. An illumination apparatus incorporating a ballast as claimed in claim 1 wherein said apparatus comprises an arrangement of one or more light emitting diodes.

27. A method of controlling an electrical load comprising the steps of:
   a) providing a switch mode converter, and arranging said converter to charge a capacitor;

b) arranging the said load to be in series with a current regulator, and arranging said series arrangement across the capacitor;
c) regularly monitoring a voltage level across the current regulator or across the load;
d) interrupting the operation of the switch mode converter if the level monitored in step (c) is indicative of the voltage across the regulator being above a predetermined maximum level, wherein said interruption comprises preventing said converter from charging said capacitor; and
e) removing the interruption to the switch mode converter if the level monitored in step (c) is indicative of the voltage across the regulator being below a predetermined minimum level;
wherein said minimum and maximum levels are chosen as allowing the current regulator to maintain a differential impedance above a predetermined minimum value.

28. A method as described in claim 27 comprising the additional step of providing a shallow-mode feedback signal to the switch-mode converter, wherein said shallow-mode feedback signal is responsive to the voltage across the current regulator, and wherein the said shallow-mode feedback signal is used to control the switching parameters of the said switch-mode converter in such a manner as to maintain a substantially constant voltage across the current regulator.

* * * * *